(12) United States Patent
Hoffmann et al.

(10) Patent No.: US 8,294,405 B2
(45) Date of Patent: Oct. 23, 2012

(54) METHOD AND DEVICE FOR GUIDING THE MOVEMENT OF A MOVING MACHINE ELEMENT ON A NUMERICALLY CONTROLLED MACHINE

(75) Inventors: Walter Hoffmann, Erlangen (DE); Wolfgang Papiernik, Neunkirchen (DE); Tomas Sauer, Feucht (DE)

(73) Assignee: Siemens Aktiengesellschaft, München (DE)

( * ) Notice: Subject to any disclaimer, the term of this patent is extended or adjusted under 35 U.S.C. 154(b) by 768 days.

(21) Appl. No.: 11/721,614

(22) PCT Filed: Dec. 5, 2005

(86) PCT No.: PCT/EP2005/056454
§ 371 (c)(1),
(2), (4) Date: Aug. 17, 2009

(87) PCT Pub. No.: WO2006/063945
PCT Pub. Date: Jun. 22, 2006

(65) Prior Publication Data
US 2009/0295323 A1 Dec. 3, 2009

(30) Foreign Application Priority Data
Dec. 13, 2004 (DE) .......................... 10 2004 059 966

(51) Int. Cl.
*G05B 19/29* (2006.01)
(52) U.S. Cl. ................... 318/600; 318/560; 318/568.18; 318/569
(58) Field of Classification Search .............. 318/560, 318/568.18, 569, 600, 594, 609, 574, 575, 318/651, 678, 568.15; 700/63
See application file for complete search history.

(56) References Cited

U.S. PATENT DOCUMENTS
5,331,264 A * 7/1994 Cheng et al. ............. 318/568.11
(Continued)

FOREIGN PATENT DOCUMENTS
DE 199 44 607 A1 3/2001
(Continued)

OTHER PUBLICATIONS

Numerische Mathematik 1, Lineare and nichtlineare Gleichungssysteme, Interpolation, numerische Integration [Numerical mathematics 1, linear and nonlinear equation systems, interpolation, numerical integration]; Jochen Werner; Vieweg-Studium; vol. 32: Aufbaukurs Mathematik; 1992.

*Primary Examiner* — Walter Benson
*Assistant Examiner* — Antony M Paul
(74) *Attorney, Agent, or Firm* — Henry M. Feiereisen LLC

(57) ABSTRACT

The invention relates to a method and a device for guiding the movement of a moving machine element on a numerically controlled machine, whereby maximum possible track speed, maximum possible track acceleration, and maximum possible track jerk are defined by means of given restrictions on track axes. The local minima for the maximum possible track speed are determined, whereby for each local minimum a corresponding left-sided and right-sided track speed segment is determined, whereby, for track values for the displacement track to the left and right of a given minimum, the resulting track speed is determined by using the maximum possible track jerk and the maximum possible track acceleration until the track speed exceeds the maximum possible track speed to the left and right of the minimum, a track jerk curve for the movement guidance is hence determined. According to the invention, a simple method and a simple device for movement guidance of a moving machine element on a numerically controlled machine are achieved, with as good as possible a usage of the restrictions on machine axes of the machine.

7 Claims, 5 Drawing Sheets

U.S. PATENT DOCUMENTS

| | | | | |
|---|---|---|---|---|
| 5,832,188 A * | 11/1998 | Papiernik | | 700/245 |
| 6,002,231 A * | 12/1999 | Dirkx et al. | | 318/609 |
| 6,223,111 B1 * | 4/2001 | Cronin et al. | | 701/51 |
| 7,208,901 B2 * | 4/2007 | Ladra et al. | | 318/600 |
| 7,319,910 B2 * | 1/2008 | Papiernik | | 700/63 |

FOREIGN PATENT DOCUMENTS

| | | |
|---|---|---|
| DE | 100 63 722 A1 | 7/2002 |
| DE | 102 00 680 A1 | 8/2003 |
| DE | 103 21 970 | 9/2004 |
| EP | 0 289 150 A2 | 11/1988 |
| JP | 11090758 A | 4/1999 |
| JP | 2001051708 A | 2/2001 |
| WO | WO 2004/102292 A2 | 11/2004 |

* cited by examiner

METHOD AND DEVICE FOR GUIDING THE MOVEMENT OF A MOVING MACHINE ELEMENT ON A NUMERICALLY CONTROLLED MACHINE

BACKGROUND OF THE INVENTION

The invention relates to a method and device for guiding the movement of a moving machine element of a numerically controlled machine, wherein a movement path of the machine element is broken up into successive movement sections, wherein a maximum possible path speed, a maximum possible acceleration and a maximum possible path jolt are defined by means of predefined restrictions on machine axles.

FIG. 1 illustrates, in the form of a block circuit diagram, a customarily used electrical drive system of a machine tool, of a production machine and/or of a robot. In the two-axle machine illustrated by way of example in FIG. 1, a controller 1 controls the two machine axles 6a and 6b of the machine. The machine axle 6a is composed here of a regulating system 2a, a converter 3a, a drive motor 4a and a mechanism 5a which is connected to the drive motor 4a. The machine axle 6b is composed of a regulating system 2b, a converter 3b, a drive motor 4b and a mechanism 5b which is connected to the drive motor 4b. The controller 1 predefines to the regulating system 2a and the regulating system 2b setpoint position values separately for each machine axle, said values corresponding to a predefined movement path of a machine element which can be moved by means of the machine axles 6a and 6b. The regulating system 2a or 2b regulates, by means of the converter 3a or 3b, the respectively associated motor position angle of the motor 4a or 4b in accordance with the setpoint values predefined by the controller so that the predefined movement path of the machine element is carried out using the mechanism 5a or 5b which is connected to the respective drive motor 4a or 4b. A machine element is to be understood here, for example during the processing operation, as both a tool, such as for example a milling head, and a workpiece.

FIG. 2 illustrates, by way of example, such a movement path S for the two-axle machine according to FIG. 1. Here, a machine element 8, embodied as a milling head, is guided on the movement path S. The machine axle 6a from FIG. 1 is responsible here for the displacement movement in the x direction, while the machine axle 6b is responsible for the displacement movement in the y direction.

The numerical controller 1 according to FIG. 1 processes, for this purpose, component programs which have been obtained, for example with a CAD/CAM system. The geometric data for, for example, the processing of a workpiece are stored in the controller 1. The object of the controller 1 is then to generate setpoint variables for the machine axles of the machine in such a way that the machine element 8 is guided on the desired movement path S. For this purpose, additional technological information, in particular knowledge of the properties of the machine, is necessary. These properties such as, for example, the maximum rotational speeds of the drives, the maximum possible acceleration of the drives and the maximum drive torques of the drive motors are stored in machine data and known to the controller 1. The guiding of the movement then has to be planned by the controller 1 in such a way that none of the abovementioned predefined restrictions (such as for example maximum possible acceleration of a drive) is infringed. The resulting movement profiles of the drive motors of the individual machine axles of the machine have to be realizable. For this purpose, the planning of the guidance of the movement uses, as is customary in the trade, the derivations of the path length s over time.

The principle planning of such guidance of a movement of a machine element is illustrated schematically in FIG. 3. In accordance with the predefined movement path S, with the path length s over which the machine element 8 travels, the path jolt $\dddot{s}$ ($\dddot{s}=r(s)$), which represents three times the derivative of the path length s over time and which is fed to the so-called three memory model (illustrated in FIG. 3) as an input variable, is calculated from the movement guidance. The path jolt $\dddot{s}$ is the maximum time derivative in the integration chain which is formed from the integrators 9a, 9b and 9c. A path acceleration $\ddot{s}$ ($\ddot{s}=a(s)$) is calculated from the path jolt $\dddot{s}$, and by further integration a path speed $\dot{s}$ ($\dot{s}=v(s)$) is calculated from the path acceleration $\ddot{s}$, and by further integration the path length s is calculated from the path speed $\dot{s}$.

The associated motor position setpoint angle $\phi_{MS}$, the associated motor setpoint angle speed $\dot{\phi}_{MS}$, the associated motor setpoint angle acceleration $\ddot{\phi}_{MS}$ and the associated motor setpoint angle jolt $\dddot{\phi}_{MS}$ can be calculated from the path length s, the path speed $\dot{s}$, the path acceleration $\ddot{s}$ and the path jolt $\dddot{s}$ in accordance with the specific kinematic transformation, which is valid for the respective machine kinematics and is known to a person skilled in the art, for each motor of the machine which is involved in the movement. The respective motor position setpoint angle $\phi_{MS}$ forms the respective setpoint value for the respectively associated position control circuit of the relevant regulating system 2a or 2b according to FIG. 1 (an associated motor position setpoint angle $\phi_{MS}$ is transferred for each machine axle, i.e. the circuit illustrated in FIG. 3 exists separately for each machine axle of the machine). This is in order to ensure that the current position of the machine element (for example of a milling head or of some other tool or else of a workpiece) follows the predefined setpoint value.

By selectively predefining the input variable path jolt $\dddot{s}$ it is possible to change all the other variables (path acceleration $\ddot{s}$, path speed $\dot{s}$ and path length s) from one state into another via suitable intermediate values by means of integration so that all the limits can be checked and complied with. The limits define a minimum time period of the processing operation. Conversely, this means that the guidance of the movement can be optimum in terms of time only if at least one variable reaches its possible maximum value each time. The restrictions which have to be taken into account in the guidance of the movement have a correspondence with the real machine. For example, the maximum rotational speeds of the drives together with transmission ratios and gradients of spindles of, for example, ball castor spindles, yield the maximum possible path speed as a limit.

By means of the predefined restrictions which are described above for the machine axles, according to the prior art the maximum possible path speed vlim(s), the maximum possible path acceleration alim(s) and the maximum possible path jolt rlim(s) for the predefined movement path S, which is broken up into successive movement sections for the purpose of determination, are determined for the predefined movement path S. This is prior art.

FIG. 4 shows the profiles of the maximum possible path speed vlim(s), of the maximum possible path acceleration alim(s) and of the maximum possible path jolt rlim(s) plotted against the path length s of the movement path S. The term maximum possible path acceleration alim(s) is understood here to mean both the maximum possible path acceleration alim(s) in the positive direction, i.e. for positive values of the path acceleration, and the maximum possible path acceleration alim(s) in the negative direction, i.e. for negative values of the path acceleration. The term maximum possible path jolt rlim(s) is understood here to mean both the maximum possible path jolt rlim(s) in the positive direction, i.e. for positive values of the path jolt, and the maximum possible path jolt rlim(s) in the negative direction, i.e. for negative values of the path jolt.

The guidance of the movement along the movement path S will now be configured within these predefined limits in such a way that said guidance is optimum with respect to time, i.e. is carried out with the highest possible path speed v(s). For this purpose, it is customary in the trade to guide the movement in such a way that the maximum possible path jolt rlim(s) is fully utilized. The jolt profile for the path jolt r(s) thus fluctuates within a movement section (in FIG. 4 the beginnings and ends of the movement sections are indicated by vertical dashed lines) to and fro between the two maximum values, wherein, in the prior art, it is necessary to comply with the additional condition that the path acceleration a(s) assumes a value of zero at the end of each path section. This is necessary since the solution which is found should be capable of being differentiated twice continuously over time so that the movement path S does not have any irregularities later. In this context, according to the prior art it is consciously accepted that the movement profile which is acquired in this way is not optimum with respect to time, i.e. that in particular the maximum possible path acceleration alim(s) and the maximum possible path speed vlim(s) are utilized only inadequately. Since the path length s itself is in turn a function of time t, in the mathematical sense the path speed v(s), the path acceleration a(s) and the path jolt r(s) constitute what are referred to as trajectories and the illustration according to FIG. 4 constitutes an illustration in the so-called phase plane.

German laid-open patent application DE 199 44 607 A1 discloses a method for controlling the speed of a numerically controlled machine tool or a robot for multiple sets.

The German patent application with file No. 103 219 70.6 discloses a method for guiding the movement of a moving machine element of a numerically controlled machine tool or production machine.

SUMMARY OF THE INVENTION

The invention is based on the object of providing a simple method and a simple device for guiding the movement of a moving machine element of a numerically controlled machine in which the restriction on the machine axles of the machine is utilized as well as possible.

This object is achieved by means of a method for guiding the movement of a moving machine element of a numerically controlled machine,
  wherein a movement path of the machine element is broken up into successive movement sections,
  wherein a maximum possible path speed, a maximum possible path acceleration and a maximum possible path jolt are defined by means of predefined restrictions on machine axles,
  wherein the local minimum values of the maximum possible path speed are determined,
  wherein for each local minimum value an associated left-hand side and an associated right-hand side path speed segment are respectively determined by the resulting path speed being determined for path values of the movement path to the left and to the right of a respective minimum value by utilizing the maximum possible path jolt and the maximum possible path acceleration until the path speed exceeds the maximum possible path speed to the left and right of the minimum value, with a path jolt profile being determined in this way for the guidance of the movement.

Furthermore, this object is achieved by a device for guiding the movement of a moving machine element of a numerically controlled machine, wherein a movement path of the machine element is broken up into successive movement sections, wherein the device has
  means for predefining a maximum possible path speed, a maximum possible path acceleration and a maximum possible path jolt by means of predefined restrictions on machine axles,
  means for determining the local minimum values of the maximum possible path speed,
  means for determining a respectively associated left-hand side and right-hand side path speed segment for each local minimum value by determining the resulting path speed for path values of the movement path to the left and to the right of a respective minimum by utilizing the maximum possible path jolt and the maximum possible path acceleration until the path speed exceeds the maximum possible path speed to the left and to the right of the minimum value.

For the invention it proves advantageous if adjacent path speed segments of two adjacent minimum values are connected to one another, while complying with the maximum possible path jolt and the maximum possible path acceleration, in such a way that at at least one connecting point the path acceleration assumes a value of zero. This constitutes a particularly simple possible way of connecting the path speed segments to one another and complying with the required condition for the possibility of double continuous differentiation of the path length s over time t.

Furthermore, it proves advantageous if at at least two connecting points the path acceleration assumes a value of zero.

In addition, it proves advantageous if at more than two connecting points the path acceleration assumes a value of zero.

In addition, it proves advantageous if the machine is embodied as a machine tool, production machine and/or as a robot since methods for guiding the movement of moving machine elements are required particularly in these technical fields.

Furthermore it proves advantageous that the device has means for determining a jolt profile for the guidance of the movement, wherein adjacent path speed segments of two adjacent minimum values are connected to one another, while complying with the maximum possible path jolt and the maximum possible path acceleration, in such a way that in at least one connecting point the path acceleration assumes a value of zero. This constitutes a particularly simple way of connecting the path speed segments to one another and complying with the required condition for the possibility of double continuous differentiation of the path length s over time t.

In addition, it proves advantageous if the device is embodied as a control device for controlling the machine. If the device is embodied as a control device for controlling the machine no separate control device is required to control the machine.

In addition it proves advantageous that a computer program product is provided for the device according to the invention, which product contains code sections with which the method according to the invention can be carried out.

Advantageous embodiments of the device can be formed in a way which is analogous with advantageous embodiments of the method, and vice versa.

BRIEF DESCRIPTION OF THE DRAWING

An exemplary embodiment of the invention is illustrated in the drawing and will be explained in more detail below. In the drawing.

DETAILED DESCRIPTION OF PREFERRED EMBODIMENTS

Figure 5:
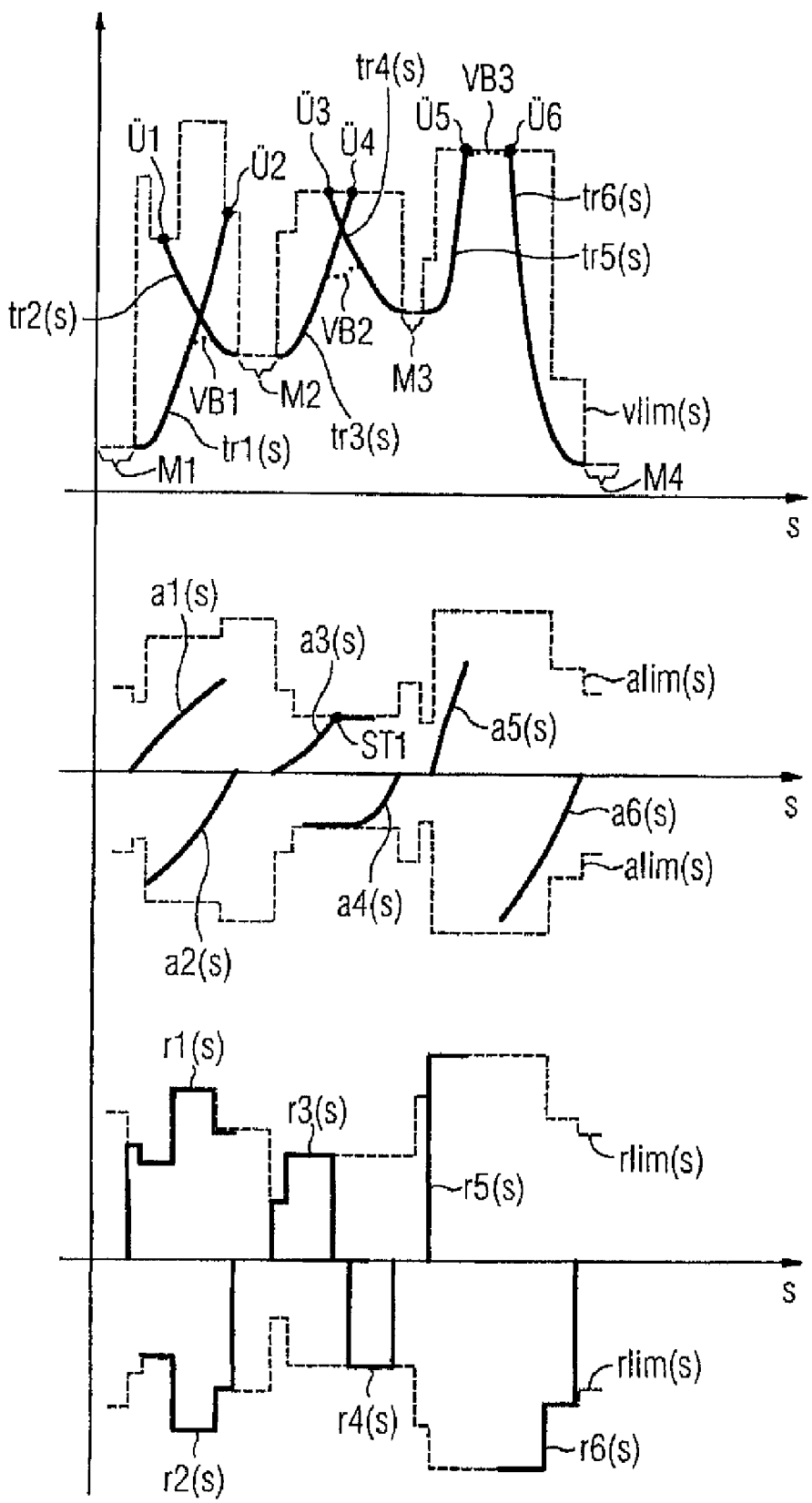
FIG. 5 shows a way of determining path speed segments according to the inventive method and the inventive device.
Figure 6:
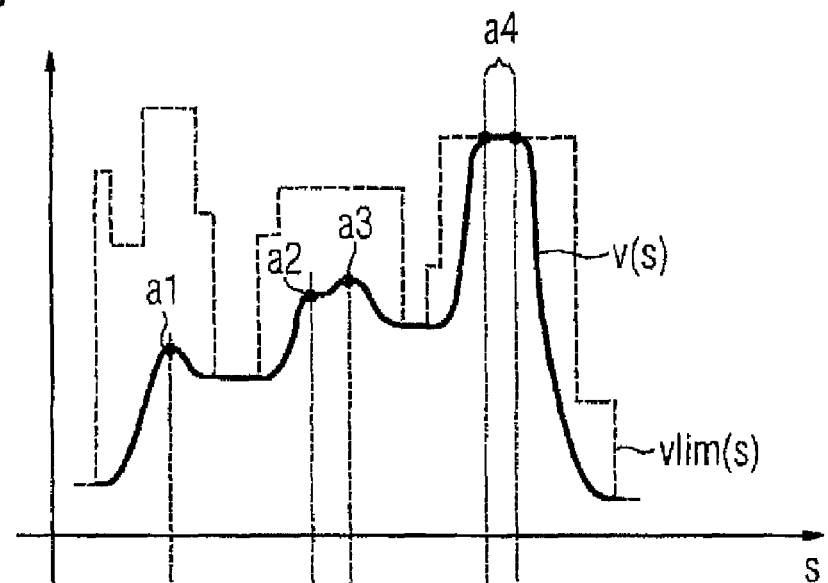
FIG. 6 shows a way of determining the path jolt profile according to the inventive method and the inventive device.
Figure 6:
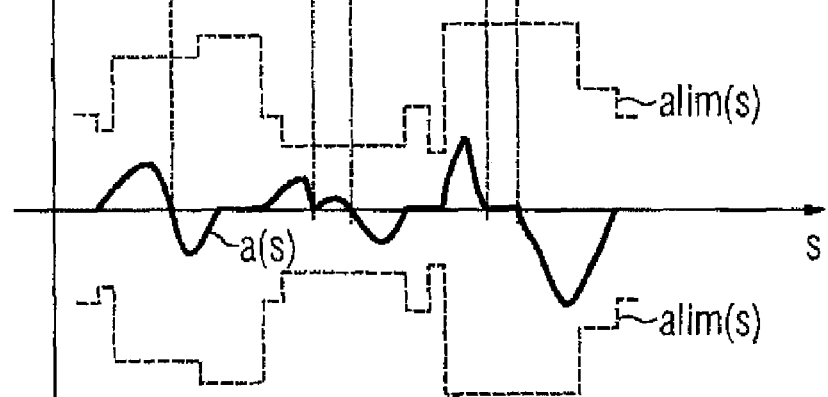
Figure 6:
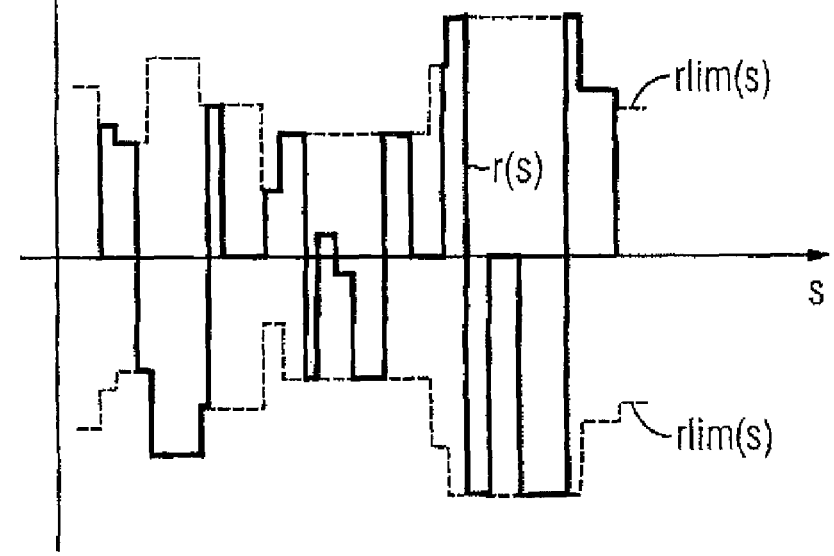
Figure 7:
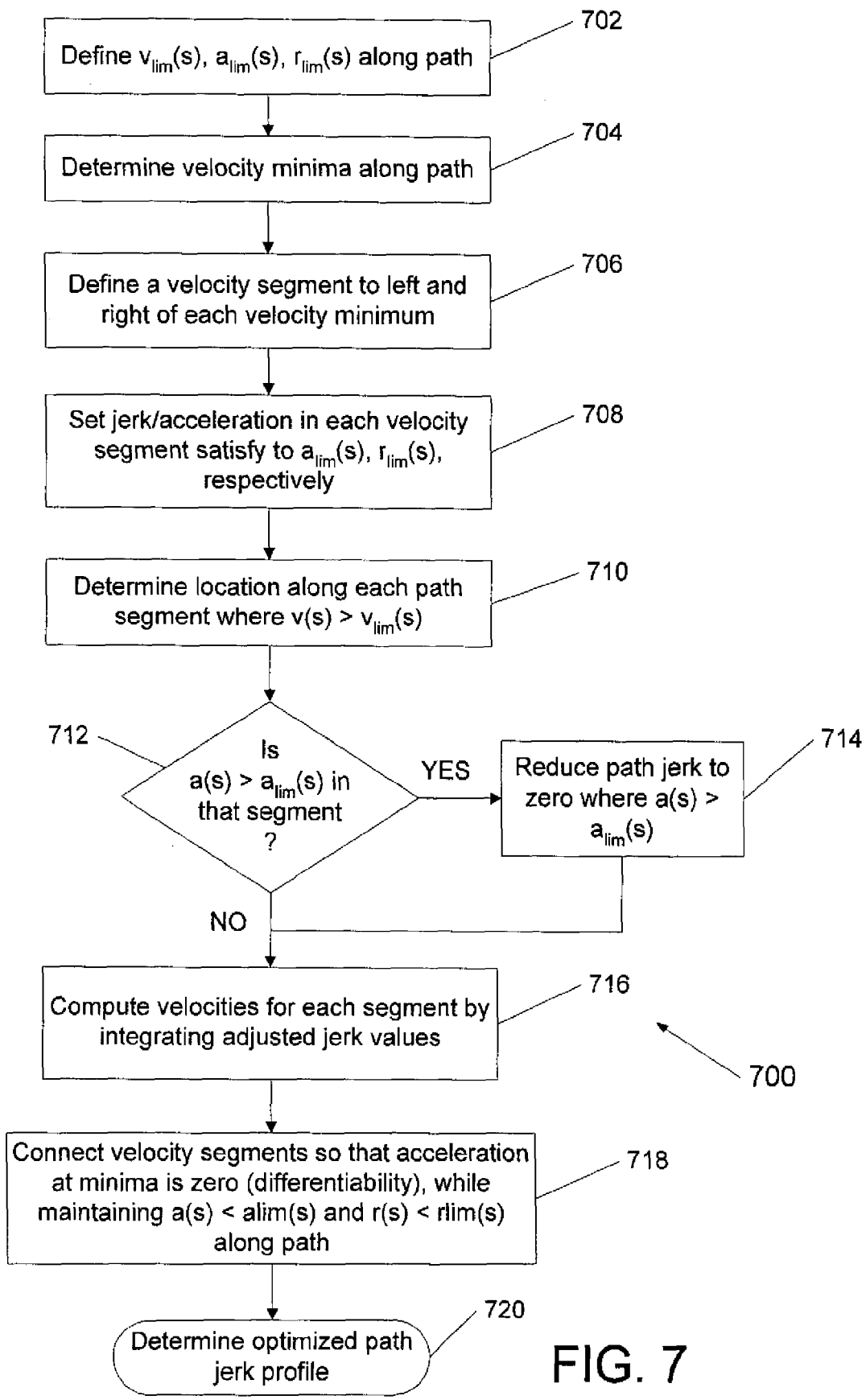
FIG. 7 illustrates a process for determining the optimal parameters for the path speed segments according to the inventive method.

The inventive method is illustrated in FIG. 5 and FIG. 6. FIG. 7 is a process flow diagram of a process 700 for determining the optimal parameters for the path speed segments according to the invention. The steps listed in the following description of the process refer to FIG. 7.

In this respect, FIGS. 5 and 6 show the maximum possible path speed vlim(s), the maximum possible path acceleration alim(s) and the maximum possible path jolt rlim(s) which are predefined for the method as limiting values, at step 702, plotted against the path length s. In a method step, the local minimum values of the maximum possible speed vlim(s) are firstly determined. In step 704, the local minimum values are designated in FIG. 5 by M1, M2, M3 and M4. Local minimum values are to be understood here as regions in which the maximum possible speed vlim(s) rises again to the left and to the right of these regions. In this context, the starting point and end point of the maximum possible speed vlim(s) also apply as local minimum values.

What is referred to as a left-hand side and a right-hand side path speed segment, i.e. a segmented path speed profile v(s) which are associated with the respective minimum value are then determined to the left and to the right of each minimum value, at step 706. As a result, for each minimum value a path speed segment which is located to the left of the respective minimum value, referred to below as the left-hand side path speed segment, is obtained, and for each minimum value an associated path speed segment which is located to the right of the minimum value, referred to below as the right-hand side path speed segment, is obtained. For the portion of the movement process which is illustrated by way of example in FIG. 5, along the movement path S with the path length s, the left-hand side path speed segments tr2(s), tr4(s) and tr6(s), and the right-hand side path speed segments tr1(s), tr3(s) and tr5(s), are thus obtained.

For each local minimum value M1, M2, M3 and M4 an associated left-hand side and right-hand side path speed segment tr1(s) to tr6(s) are thus respectively determined for the individual path values of the path length s to the left and right of a respective minimum value M1 to M4 by utilizing the maximum possible path jolt rlim(s) and the maximum possible path acceleration alim(s), at step 708, wherein the resulting path speed v(s), i.e. the respective path speed segments tr1(s) to tr6(s) are determined until the path speed v(s) exceeds the maximum possible path speed vlim(s) to the left and right of the respective minimum value, step 710. The locations at which the respective path speed segments tr1(s) to tr6(s), i.e. the path speed v(s) exceeds the maximum possible path speed vlim(s), are designated by Ü1 to Ü6 in FIG. 5.

The calculation of the respective path speed segment tr1(s) to tr6(s) is carried out here, as already stated with reference to step 708, by utilizing the maximum possible path jolt rlim(s) and the maximum possible path acceleration alim(s). The path speed segments tr1(s) to tr6(s) are determined by determining an optimized, respectively associated jolt profile r1(s) to r6(s) for each path speed segment. For this purpose, a path jolt which is as large as possible is selected as the first optimization criterion, i.e. the movement with the maximum possible path jolt rlim(s) is carried out. By integrating the path jolt profiles r1(s) to r6(s) over time t, the respectively associated path acceleration profiles a1(s) to a6(s) are obtained. For example the path acceleration a1(s) is obtained from the profile of the path jolt r1(s), with the associated path speed segment tr1(s) being obtained from the path acceleration a1(s) by integrating once more over time t.

Figure 1:
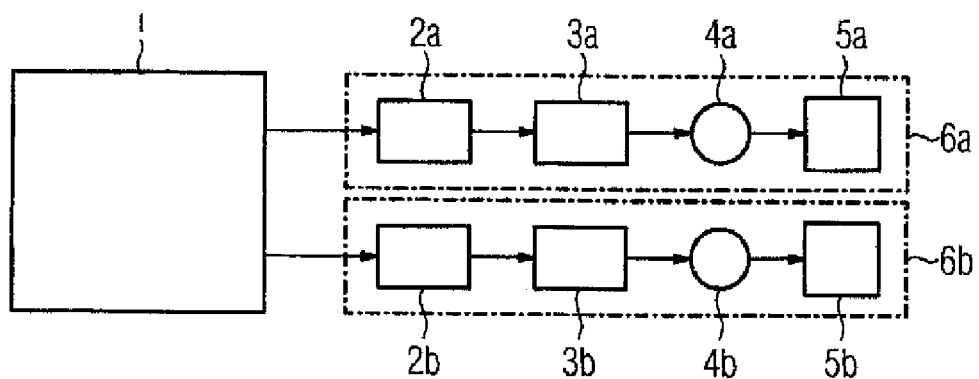
FIG. 1 shows a drive system of a machine with two machine axles.
Figure 2:
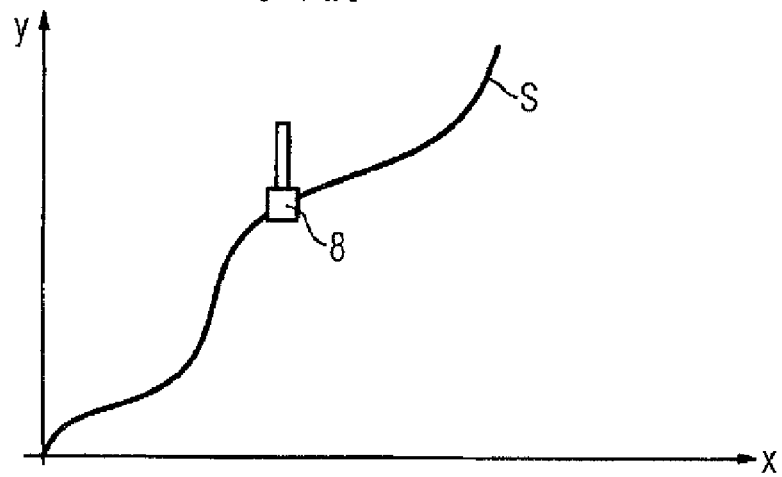
FIG. 2 shows a movement path of a machine element.
Figure 3:
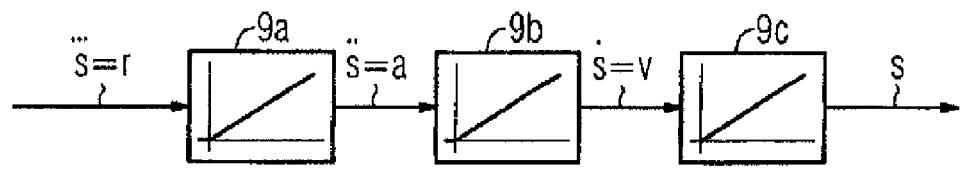
FIG. 3 shows a three memory system for determining the guidance of a movement.
Figure 4:
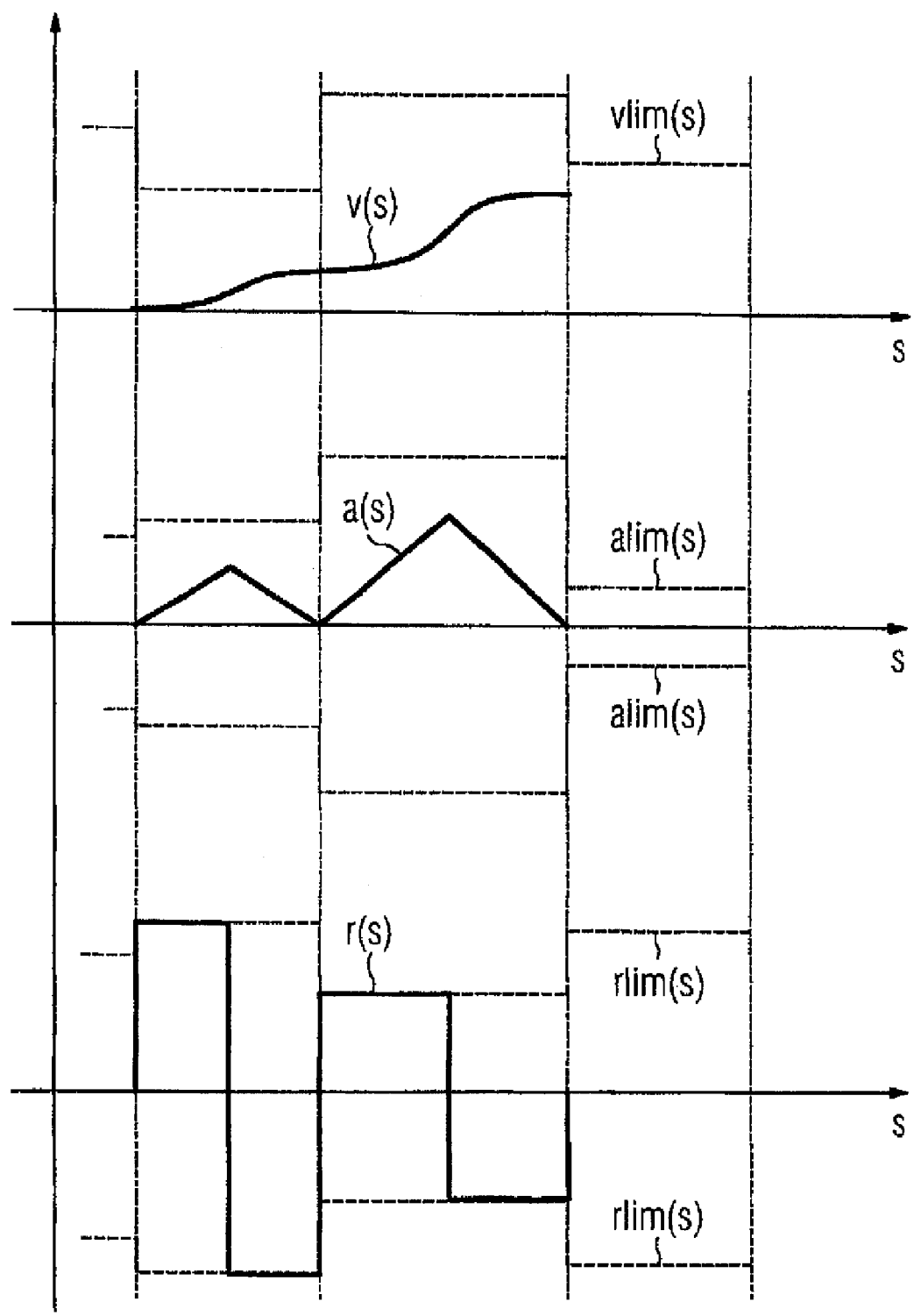
FIG. 4 shows a way of determining the path jolt according to the prior art.

Since, as already stated above, the path length s itself is in turn a function of the time t, the integration over time t in FIGS. 4, 5 and 6 corresponds to integration over the path length s.

During the determination of the respective path jolt profile r1(s) to r6(s) it is ensured that the respectively associated path acceleration a1(s) to a6(s) of the path speed segments tr1(s) to tr6(s) does not exceed the maximum possible path acceleration alim(s), at step 712. For example, the path jolt r3(s) is thus immediately reduced to a value of zero, at step 714, if the associated path acceleration a3(s) for the path speed segments tr3(s), for example at the location ST1, threatens to be unacceptably exceeded. In this way, a respectively associated path speed segment tr1(s) to tr6(s) is determined for specific movement sections from each jolt profile r1(s) to r6(s) by integrating twice, step 716.

For path values with the path length s in the region of the minimum values M1, M2, M3 and M4, the associated path jolt r(s) is assumed here to be zero, which is not illustrated in FIG. 5 for the sake of clarity since in said figure only the profiles in the region of the path speed segments are illustrated for the sake of clarity.

In a further step, adjacent path speed segments of two adjacent minimum values are connected to one another, while complying with the maximum possible path jolt rlim(s) and the maximum possible path acceleration alim(s), in such a way that in at least one connecting point the path acceleration assumes a value of zero, at step 718. A connection between adjacent path speed segments of two adjacent minimum values comprises a plurality of adjacent connecting points here.

The connections VB1, VB2 and VB3 are represented by dots at the top of FIG. 5. In the exemplary embodiment, the path speed segments tr1(s) and tr2(s) are adjacent to one another. Furthermore, the path speed segments tr3(s) and the path speed segments tr4(s) are adjacent to one another and the path speed segments tr5(s) and the path speed segments tr6(s) are adjacent to one another. The respective connections VB1 to VB3 have to be determined here by determining a suitable path jolt profile r(s) in such a way that in at least one connecting point on each connection the path acceleration a(s) assumes a value of zero. As a result, the requirement for the possibility of double continuous differentiation of the path length s over the time t is met. Process 700 ends at step 720 with the determination of an optimized jerk profile r(s).

Taking as a starting point the profile of the path jolt r(s) (illustrated below in the previous step in FIG. 5) for the individual path speed segments, the profile of the path jolt r(s) is adapted in such a way that at each connection, in at least one connecting point on the connection, the path acceleration a(s) assumes a value of zero.

FIG. 6 illustrates the corresponding resulting profiles of the path speed v(s), the path acceleration a(s) and the path jolt r(s). In this context, the adjacent path speed segments tr1(s) and tr2(s) have been connected to one another in such a way that according to FIG. 6 precisely one connecting point a1 at which the path acceleration a(s) assumes a value of zero is connected. The adjacent path speed segments tr3(s) and tr4(s) have been connected to one another in such a way that the path acceleration a(s) assumes a value of zero in at least two connecting points a2 and a3. The adjacent path speed segments tr5(s) and tr6(s) are connected to one another in the exemplary embodiment in such a way that the path acceleration a(s) assumes a value of zero in more than two connecting points, which is indicated in FIG. 6 by a region a4. Of course, the profile of the path jolt r(s) must be adapted here in such a way that the maximum possible path acceleration alim(s) and maximum possible path jolt rlim(s) are complied with.

The determination of the profile of the path jolt r(s) with the objective of bringing about a connection between adjacent path speed segments which can be differentiated continuously over time twice is carried out using numerical solution methods which are generally known to a person skilled in the art, such as for example the bisection method. Bisection methods are numerical search methods which determine the solutions approximately through repeated division in a specific interval. Bisection methods are described in the document "Numerische Mathematik 1, Lineare und nichtlineare Gleichungssysteme, Interpolation, numerische Integration [Numerical mathematics 1, linear and nonlinear equation systems, interpolation, numerical integration]; Jochen Werner; Vieweg-Studium; vol. 32: Aufbaukurs Mathematik; 1992".

The profile of the path jolt r(s) is preferably determined here on the further secondary condition that the path speed v(s) is as large as possible in the region of the connection.

As is apparent above from the profile of the path speed v(s) in FIG. 6, a profile for the path speed v(s) which is relatively close to the maximum possible profile of the maximum possible path speed vlim(s) is obtained. The guidance of the movement of the moving machine element of the numerically controlled machine is thus carried out at the highest possible speed. The degree of optimization of the profile of the path speed v(s) is increased significantly with the method and device according to the invention compared to the profile of the path speed v(s) which is determined with the method which is customary in the trade and illustrated in FIG. 4.

Furthermore, a movement profile which is smoother compared to the prior art is also obtained since the path acceleration does not have to be reduced to zero in every movement section.

Furthermore, the method according to the invention has the advantage that the quality of the result no longer depends to a high degree on the width of the movement sections, as was the case in the prior art. By dividing the overall optimizing into a plurality of small optimizations around the local minimum values it is possible to calculate the solution to the problem relatively easily.

Of course, it is also conceivable for the connections between adjacent path speed segments also to be calculated in some other way, in particular to be calculated in such a way that the path acceleration does not assume a value of zero in any connecting point. However, disadvantages in terms of the continuity of the acquired movement path s then occur.

What is claimed is:

1. A method for guiding the movement of a machine element of a numerically controlled machine, comprising the steps of:
    defining limitations on movement of machine axles, said limitations including a maximum permissible path speed, a maximum permissible path acceleration and a maximum permissible jerk,
    subdividing a movement path of the machine element into successive movement sections,
    determining local minima of the maximum permissible path speed of the machine axles,
    determining for each local minimum a left-hand side and a right-hand side path speed segment,
    determining a speed profile by increasing for each of the left-hand side and the right-hand side path speed segments a resulting path speed, while maintaining a jerk that is less than the maximum permissible jerk and a path acceleration that is less than the maximum permissible path acceleration, until the path speed exceeds the maximum permissible path speed,
    connecting adjacent path speed segments of adjacent minima to one another at at least one connecting point, so that the path acceleration assumes a value of zero at the at least one connecting point, while complying with the maximum permissible jerk and the maximum permissible path acceleration, and
    determining from the determined speed profile an optimized jerk profile for the guiding the movement of the machine element.

2. The method of claim 1, wherein the path acceleration assumes a value of zero at at least two connecting points.

3. The method of claim 1, wherein the path acceleration assumes a value of zero at more than two connecting points.

4. The method of claim 1, wherein the numerically controlled machine is embodied as at least one of a machine tool, as a production machine and a robot.

5. A device for guiding a movement of a machine element of a numerically controlled machine along a movement path, wherein the movement path is subdivided into successive movement sections, the device comprising:
    means for moving the machine element, said means configured to limit movement of machine axles by limiting a maximum permissible path speed, a maximum permissible path acceleration and a maximum permissible jerk,
    means for determining local minima of the maximum permissible path speed of the machine axles,
    means for determining for each local minimum a left-hand side and a right-hand side path speed segment,
    means for determining a speed profile by increasing for each of the left-hand side and the right-hand side path speed segments a resulting path speed, while maintaining a jerk that is less than the maximum permissible jerk and a path acceleration that is less than the maximum permissible path acceleration, until the path speed exceeds the maximum permissible path speed,
    means for connecting adjacent path speed segments of adjacent minima to one another at at least one connecting point, so that the path acceleration assumes a value of zero at the at least one connecting point, while complying with the maximum permissible jerk and the maximum permissible path acceleration, and
    means for determining from the determined speed profile an optimized jerk profile for the guiding the movement of the machine element.

6. The device of claim 5, wherein the device is embodied as a control device for controlling the numerically controlled machine.

7. A computer program embodied on a non-transitory computer-readable medium, said computer program comprising code sections which when executed on a computer, enable the computer to guide a movement of a machine element of a numerically controlled machine by performing the steps of:

defining limitations on movement of machine axles, said limitations including a maximum permissible path speed, a maximum permissible path acceleration and a maximum permissible jerk, subdividing a movement path of the machine element into successive movement sections, determining local minima of the maximum permissible path speed of the machine axles, determining for each local minimum a left-hand side and a right-hand side path speed segment, determining a speed profile by increasing for each of the left-hand side and the right-hand side path speed segments a resulting path speed, while maintaining a jerk that is less than the maximum permissible jerk and a path acceleration that is less than the maximum permissible path acceleration, until the path speed exceeds the maximum permissible path speed, connecting adjacent path speed segments of adjacent minima to one another at at least one connecting point, so that the path acceleration assumes a value of zero at the at least one connecting point, while complying with the maximum permissible jerk and the maximum permissible path acceleration, and determining from the determined speed profile an optimized jerk profile for the guiding the movement of the machine element.

* * * * *